(12) United States Patent
Kontio et al.

(10) Patent No.: US 11,700,043 B2
(45) Date of Patent: Jul. 11, 2023

(54) BEAMFORMING MONITORING APPARATUS

(71) Applicant: Nokia Solutions and Networks Oy, Espoo (FI)

(72) Inventors: Teemu Kontio, Oulu (FI); Marko Koskinen, Oulu (FI); Petri Koivukangas, Kempele (FI); Tuomo Ekdahl, Jaali (FI)

(73) Assignee: Nokia Solutions and Networks Oy, Espoo (FI)

( * ) Notice: Subject to any disclaimer, the term of this patent is extended or adjusted under 35 U.S.C. 154(b) by 65 days.

(21) Appl. No.: 17/293,095

(22) PCT Filed: Nov. 13, 2018

(86) PCT No.: PCT/EP2018/081004
§ 371 (c)(1),
(2) Date: May 12, 2021

(87) PCT Pub. No.: WO2020/098911
PCT Pub. Date: May 22, 2020

(65) Prior Publication Data
US 2021/0409082 A1    Dec. 30, 2021

(51) Int. Cl.
*H04B 7/06* (2006.01)
*H04L 41/22* (2022.01)
(Continued)

(52) U.S. Cl.
CPC ......... *H04B 7/0617* (2013.01); *H04B 7/0632* (2013.01); *H04L 41/22* (2013.01); *H04W 24/10* (2013.01); *H04W 72/542* (2023.01)

(58) Field of Classification Search
CPC ..... H04B 7/0617; H04B 7/0632; H04L 41/22; H04L 43/08; H04W 24/10; H04W 72/085; H04W 24/08
See application file for complete search history.

(56) References Cited

U.S. PATENT DOCUMENTS

| 8,364,141 B1 * | 1/2013 | Kateley | H04W 64/00 370/242 |
| 2005/0096538 A1 * | 5/2005 | Chomas | G01S 15/8925 600/437 |

(Continued)

FOREIGN PATENT DOCUMENTS

| WO | 2020/098912 A1 | 5/2020 |
| WO | 2020/098913 A1 | 5/2020 |

OTHER PUBLICATIONS

International Search Report and Written Opinion received for corresponding Patent Cooperation Treaty Application No. PCT/EP2018/081004, dated Jul. 5, 2019, 14 pages.

*Primary Examiner* — Sung S Ahn
(74) *Attorney, Agent, or Firm* — Harrington & Smith

(57) ABSTRACT

Beamforming monitoring apparatus and method are disclosed. The method, comprises receiving (300) parameter data of radio connections between transceivers of a radio access network, the parameter data comprising transmission direction of the beams used in transmission and quality indicators related to transmitted beams; organising (302) data into one or more layers based on parameter data and connections at a given time resolution; receiving (304) a selection of layers at a given time instant; receiving (306) a selection of a view type; and controlling (308) displaying of the selected layers of the given time instant using the selected view type.

19 Claims, 6 Drawing Sheets

(51) Int. Cl.
*H04W 24/10* (2009.01)
*H04W 72/542* (2023.01)

(56) References Cited

U.S. PATENT DOCUMENTS

2015/0188800 A1  7/2015  Macdonald et al.
2018/0123906 A1* 5/2018  Liao ..................... G06T 19/006

* cited by examiner

BEAMFORMING MONITORING APPARATUS

RELATED APPLICATION

This application was originally filed as PCT Application No. PCT/EP2018/081004, filed on Nov. 13, 2018, of which is incorporated herein by reference in its entirety.

TECHNICAL FIELD

The exemplary and non-limiting embodiments relate to wireless communication systems.

BACKGROUND

Wireless telecommunication systems are under constant development. There is a constant need for higher data rates and high quality of service. Partly for these reasons the modern telecommunication systems, such as fifth generation, 5G, networks are moving towards millimeter-wave, mmWave, frequencies to seek for wide spectrum access, which eventually enables extremely high data rates.

To achieve high capacity and data rate phased antenna arrays are being used in the transmission and reception of signals. Phased antenna arrays typically comprise a multitude of antennas separated from each other by a given distance. A signal to be transmitted is fed to a number of antennas comprising an antenna array and the signal to each antenna is phased in such a manner that the antenna array forms an antenna beam, so called main lobe, to a desired direction. This is often denoted as beamforming. Using many antennas in an array improves the directivity and this high antenna directivity may be used to compensate for high path losses at higher frequencies.

Beamforming requires complex processing and monitoring the operation is important so that possible problems may be detected and corrected with as small delays as possible. Therefore performance analysis of the system should be efficient and easy for maintenance and research personnel.

BRIEF DESCRIPTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to a more detailed description that is presented later.

According to an aspect of the present invention, there is provided apparatuses of claims 1 and 11.

According to an aspect of the present invention, there is provided a method of claim 12.

BRIEF DESCRIPTION OF DRAWINGS

One or more examples of implementations are set forth in more detail in the accompanying drawings and the description below. Other features will be apparent from the description and drawings, and from the claims.

DETAILED DESCRIPTION OF SOME EMBODIMENTS

In the following, different exemplifying embodiments will be described using, as an example of an access architecture to which the embodiments may be applied, a radio access architecture based on long term evolution advanced (LTE Advanced, LTE-A) or new radio (NR, 5G), without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
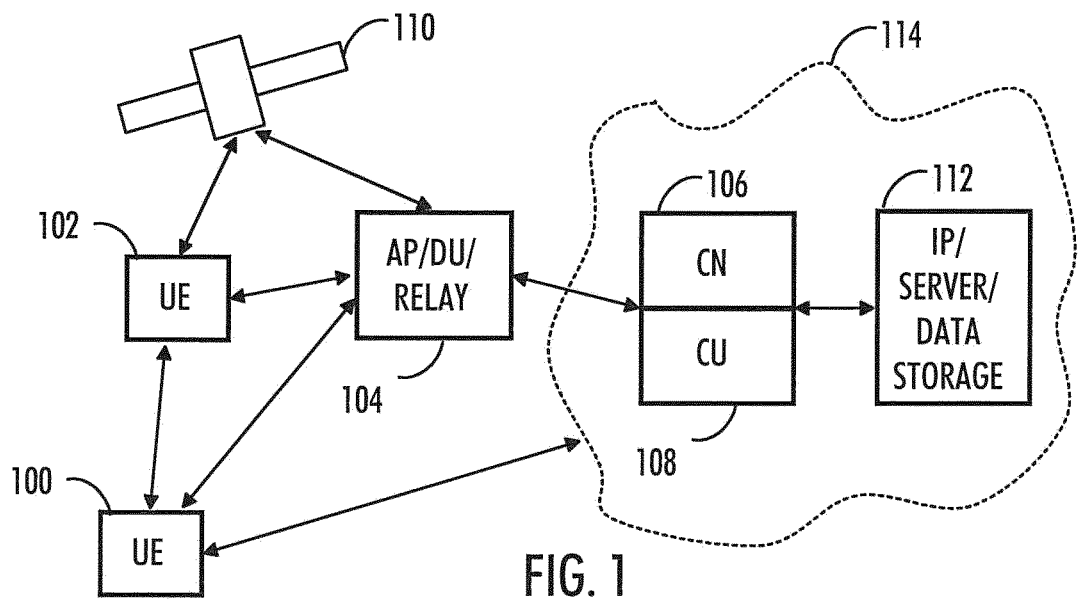
FIG. 1 illustrates a general architecture of an example communication system.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows user devices 100 and 102 configured to be in a wireless connection on one or more communication channels in a cell with an access node (such as (e/g)NodeB) 104 providing the cell. The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node, host, server or access point etc. entity suitable for such a usage.

A communications system typically comprises more than one (e/g)NodeB in which case the (e/g)NodeBs may also be configured to communicate with one another over links, wired or wireless, designed for the purpose. These links may be used for data and signaling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 106 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc.

The user device (also called UE, user equipment, user terminal, terminal device, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. The user device may also utilise cloud. In some applications, a user device may comprise a small portable device with radio parts (such as a watch, earphones or eyeglasses) and the computation is carried out in the cloud. The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also being integradable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 112, or utilise services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 104) and non-real time functions being carried out in a centralized manner (in a centralized unit, CU 108).

It should also be understood that the distribution of labor between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

In an embodiment, 5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilize geostationary earth orbit (GEO) satellite systems, but also low earth orbit (LEO) satellite systems, in particular mega-constellations (systems in which hundreds of (nano)satellites are deployed). Each satellite 110 in the mega-constellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

As mentioned, radio access network may be split into two logical entities called Central Unit (CU) and Distributed Unit (DU). In prior art, both CU and DU supplied by the same vendor. Thus they are designed together and interworking between the units is easy. The interface between CU and DU is currently being standardized by 3GPP and it is denoted F1 interface. Therefore in the future the network operators may have the flexibility to choose different vendors for CU and DU. Different vendors can provide different failure and recovery characteristics for the units. If the failure and recovery scenarios of the units are not handled in a coordinated manner, it will result in inconsistent states in the CU and DU (which may lead to subsequent call failures, for example). Thus there is a need to enable the CU and DU from different vendors to coordinate operation to handle failure conditions and recovery, taking into account the potential differences in resiliency capabilities between the CU and DU.

As mentioned, antenna arrays with multiple antennas are utilized in modern wireless communication systems. In an embodiment, the antenna array comprises a set of phased subarrays each comprising a set of antennas and each configured to transmit or receive an independent data signal utilising a beam at a given direction.

Phased antenna arrays are particularly useful at high frequencies such as mmWave frequencies as due to the high frequency multiple antennas may be designed with a relatively compact form factor. Using many antennas in an array improves the directivity and this high antenna directivity may be used to compensate for high path losses at higher frequencies.

In MIMO, typically multiple antennas in an antenna array are used for transmitting and receiving each data signal. In Massive MIMO, mMIMO, the number of antennas is large. With a large number of antenna elements in an antenna array, it is possible to allocate one or more beams specific to each user. It is also possible to allocate a beam to each user and control the beam to follow a moving user.

Figure 2:
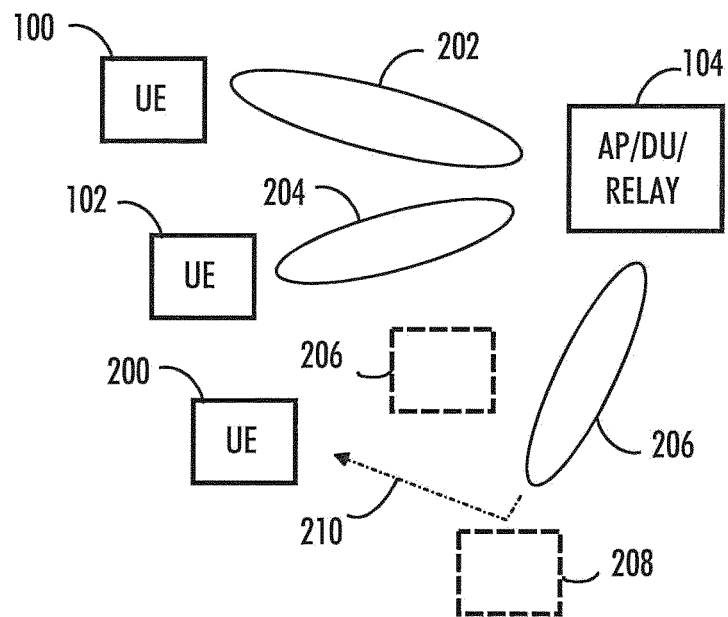
FIG. 2 illustrates a simplified example of communication between network entities where beamforming is used.

FIG. 2 illustrates a simplified example of a possible situation. An access point or base station 104 is transmitting to three user terminals 100, 102, 200. Two terminals 100, 102 have a line-of sight with the access point and the access point may transmit a beam 202, 204 towards the terminals. One terminal 200 has no line-of-sight which is obstructed by a building 206 or some other object. The access point transmits a beam 206 which reflects 210 from a building or some other object 208 towards the user terminal. As the terminals move, the beam directions constantly change, as also parameters related to the beams and quality of service related to transmissions.

Same situation applies also to uplink connections.

Beamforming and mMIMO introduce new possibilities and challenges in the design and use of telecommunication systems. Beamforming and mMIMO requires complex processing in (e/g)NodeBs and measuring actual performance of transmissions is requires often over the air measurements as most of the components are integrated directly to the antenna. Measurements can be done for example using a moving car equipped with suitable measurement hardware. However, these measurements are costly and one-time measurements runs. A situation cannot be re-examined as the outside conditions are subject to change constantly. Thus, there is growing need to monitor and examine different real life use cases in a controlled manner.

Figure 3:
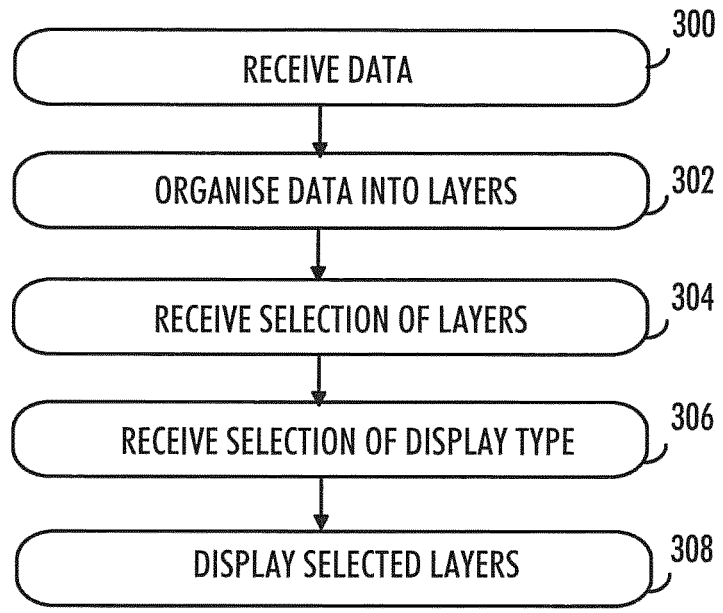
FIGS. 3, 4 and 5 are flowcharts illustrating some examples of embodiments.
Figure 4:

The flowcharts of FIGS. 3 and 4 illustrate an example of an embodiment in an apparatus. The apparatus may be connected to an access point, a remote radio head or a base station comprising radio parts, for example. In an embodiment, the apparatus may be a part of an access point, a remote radio head or a base station. In an embodiment, the apparatus may be be any beamforming transceiver, an end user device and/or installed on any kind on vehicle.

In step 300, the apparatus is configured to receive parameter data of radio connections between transceivers of a radio access network, the parameter data comprising transmission direction of the beams used in transmission and quality indicators related to transmitted beams. The transceivers may be an access point, a remote radio head or a base station communicating with a set of user terminals, for example. Either uplink data, downlink data or both may be obtained. In an embodiment, the apparatus receives the data from the transceiver transmitting or receiving the beams.

In step 302, the apparatus is configured to organise data into one or more layers based on parameter data and connections at a given time resolution. Layering is describe in more detail below.

In step 304, the apparatus is configured to receive a selection of layers at a given time instant. In an embodiment, the selection of layers is obtained from a user via a user interface. In an embodiment, the selection may be performed based on some criteria depending on the parameters and quality indicators.

In step 306, the apparatus is configured to receive a selection of a view type. There may be various view types available, such as heat charts, 3D heat charts, 2D views, persistence view, for example.

In an embodiment, a view type may comprise displaying layers on top of a map, such as a geographical map.

In an embodiment, a view type may comprise displaying layers on top of three dimensional view from the transmitter of the beams.

In step 308, the apparatus is configured to control displaying of the selected layers of the given time instant using the selected view type. The display may be a part of the apparatus or operationally connected to the apparatus in a wired or wireless manner.

In an embodiment, time resolution is transmission time interval of the radio access network.

The proposed arrangement may be utilised to indicate potential problems in the communication between access points and user terminals. FIG. 4 illustrates an example.

In step 300, which corresponds the first step of FIG. 3, the apparatus is configured to receive parameter data of radio connections between transceivers of a radio access network, the parameter data comprising transmission direction of the beams used in transmission and quality indicators related to transmitted beams In step 400, the apparatus is configured to compare a received parameter or quality indicator related to a beam or a layer to a threshold. Crossing a threshold may indicate a problem in the communication. To reveal possible problems triggering can be used for any unexpected quick change, against set limit line or any unexpected behaviour. For example, throughput of a connection may be monitored and when the throughput drops below a given threshold the time instant when this happens may be searched to see overall behaviour for different layers.

In an embodiment, cell, user and beam parameters can contain different available parameters, such as direction of the transmitted beam and used transmission power used in the transmission. The quality of the radio channel may be estimated through a series of radio parameters, such as Channel Quality Indicator (CQI), Received Signal Strength Indicator (RSSI), Reference Signal Received Power (RSRP), Reference Signal Receive Quality (RSRQ) and Signal to Noise Ratio (SNR).

In step 402, the apparatus is configured to select beam(s) or layer(s) for display based on the comparison.

In step 404, the apparatus is configured to display the selected beam(s) or layer(s).

Figure 5:
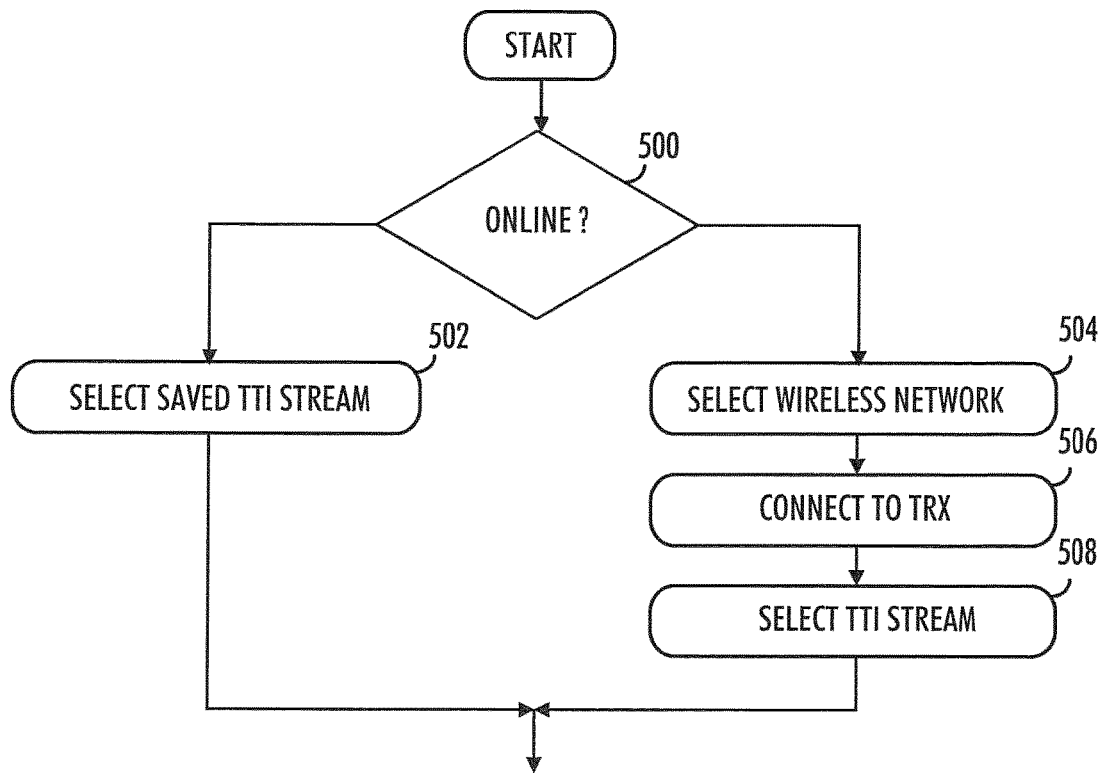

The flowchart of FIG. 5 illustrates an example of an embodiment in an apparatus.

In step 500, the apparatus is configured to receive selection whether the analysis is to be performed online or using stored data. If stored data is to be used, the apparatus is configured to receive or select in step 502 a saved data stream from a memory.

Online analysis means that the data stream is received directly as the communication is performed.

In step 504, the apparatus is configured to select or receive selection of the wireless communication network to analyse.

In step 506, the apparatus is configured to connect to the transceiver sending the connection related data.

In step 508, the apparatus is configured to select the stream(s) to monitor. A stream here denotes the connection between transceivers to monitor.

From step 502 and 508 the operation may continue as in FIGS. 3 and 4.

Figure 6:
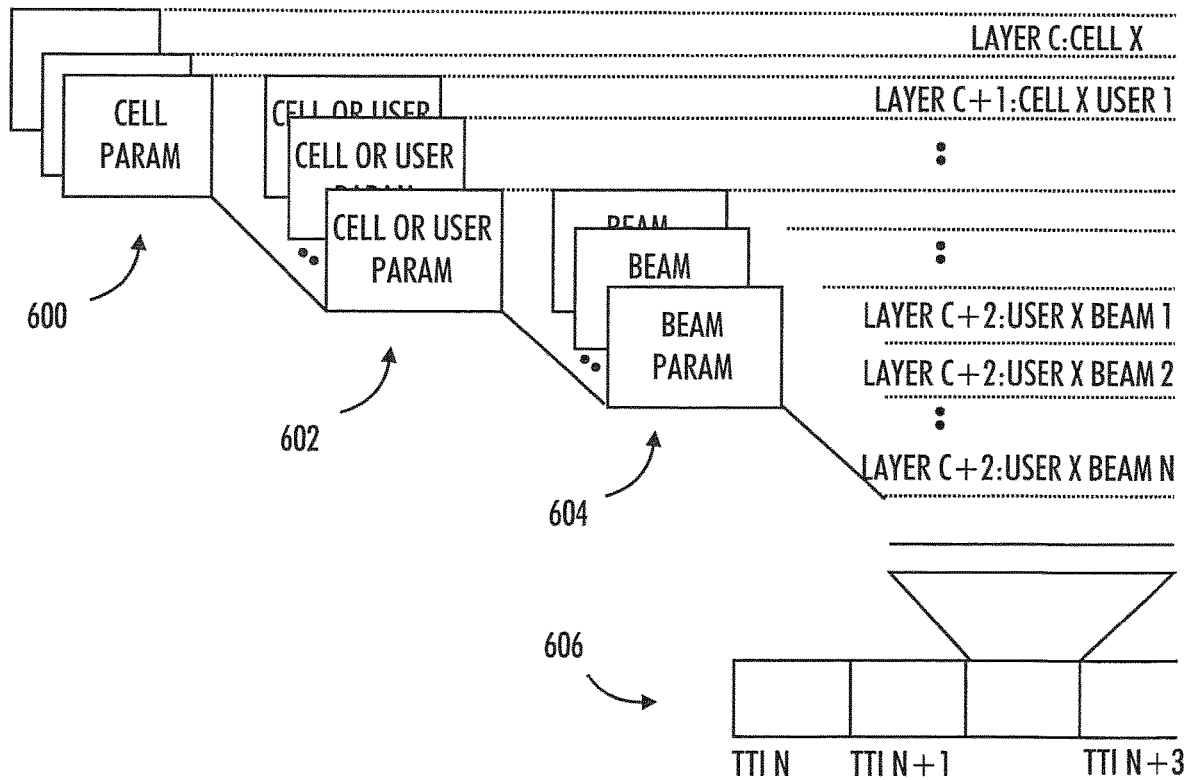
FIG. 6 illustrates layering of data.

FIG. 6 illustrates an example of layering of data. Transmitters, especially access points and base stations, generate a vast amount of data when utilising beamforming. Multiple cells, users and beams create complicated environment and in order to analyse possible problematic issues efficiently there may be need to filter available layers by different parameters and visualize only selected layers at relevant time instances. Filtering can be done for example for active users for specific transmission time interval, TTI. To be able to create layers and find the relevant layers the available data must be processed.

Processing the data is a cumbersome process and partly for this reason analysing the operation of beamforming has been difficult.

In an embodiment, the apparatus receiving the data is configured to process the data by adding metadata to the received data. Metadata may comprise information on time instant, cell identification, user identification, beam related data. The processed data may be stored so that different parts of data may now be searched for or filtered according to needs. Thus, after processing, data related to a user, or a beam, or occurring at a given time instant may be separated and analysed.

A non-limiting examples of metadata utilising common json (JavaScript Object Notation) format is as follows. As one skilled in the art is well aware, there exists several formats from which json is only an example. In addition, the data items disclosed below are merely example of possible fields that may be included in the metadata.

```
{
"metadata_header": {
"timestamp": 2018-10-11T08:59:44+00:00,
"frame_number":1020,
"cell":1,
"user":0,
"beam":4
}
```

The above defines time instant of data, frame number of communication, cell identification, user identification and beam number. The identification numbers may be used to separate cells, users and beams form each other.

```
{
"measurement_data_bts1": {
"cqi":1,
"rssi":-10,
"rsrp":-80,
"rsrq":11.5,
"snr":7.8,
"active_timeslot":True,
"ul_throughput_mbs":48.2
}
```

The above defines data from access point or base station measurement: Channel Quality Indicator (CQI), Received Signal Strength Indicator (RSSI), Reference Signal Received Power (RSRP), Reference Signal Receive Quality (RSRQ) and Signal to Noise Ratio (SNR) and uplink throughput.

```
"measurement_data_mobile1": {
"cqi":1,
"rssi":-10,
"rsrp":-80,
"rsrq":11.5,
"snr":7.8,
"active_timeslot":True,
"dl_throughput_mbs":148.3,
}
```

The above defines data from user terminal measurement: Channel Quality Indicator (CQI), Received Signal Strength Indicator (RSSI), Reference Signal Received Power (RSRP), Reference Signal Receive Quality (RSRQ) and Signal to Noise Ratio (SNR) and downlink throughput.

```
"beamDirections": [
    {
        "azimuth": 60,
        "elevation": -10,
        "tapering": "0",
        "polarization": "90"
    }
].
```

The above defines beam directions as angles and polarization type of transmission. In an embodiment, the beam directions may also be given as beam coefficients from which the angles may be calculated.

Utilizing metadata (of the types disclosed above or of some other type) layering of data is possible. On one layer C there may be beams of a given cell 600. On next layer C−1 there may be user 602 of the cell. One next layer C+2 there may be a beam or beams 604 of a given user. Different time instants 606 may be examined. In this example, the time instants comprise a stream of successive Transmission Time Intervals, TTI.

Figure 7A:
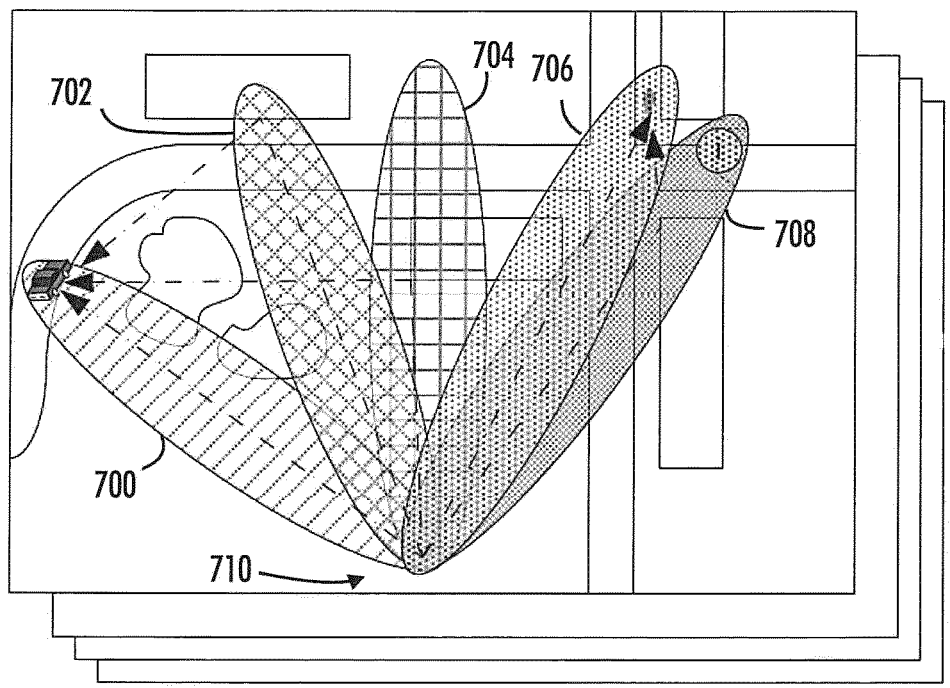
FIGS. 7A, 7B and 7C illustrate different view types.

As mentioned, when displaying the layers different visualization methods may be used. FIG. 7A illustrates an example, where a view type may comprises displaying layers on top of a map, such as a geographical map. FIG. 7A shows 5 beams 700, 702, 704, 706 and 708 transmitted by an access point 710. The underlying map shows building in the area served by the access point. In this example three of the beams 700, 702, 704 serve the same user and other beams serve other another user.

Figure 7B:
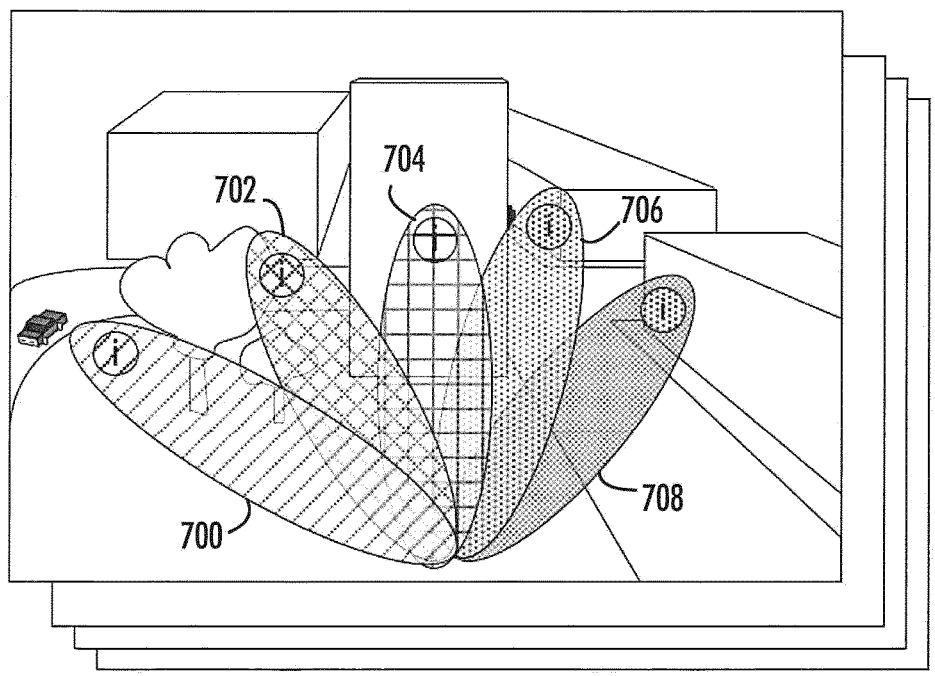

FIG. 7B illustrates an example, where a view type may comprise displaying layers on top of three dimensional view from the transmitter of the beams. FIG. 7B illustrates the same example as FIG. 7A with beams 700, 702, 704, 706 and 708 transmitted by an access point 710.

Figure 7C:
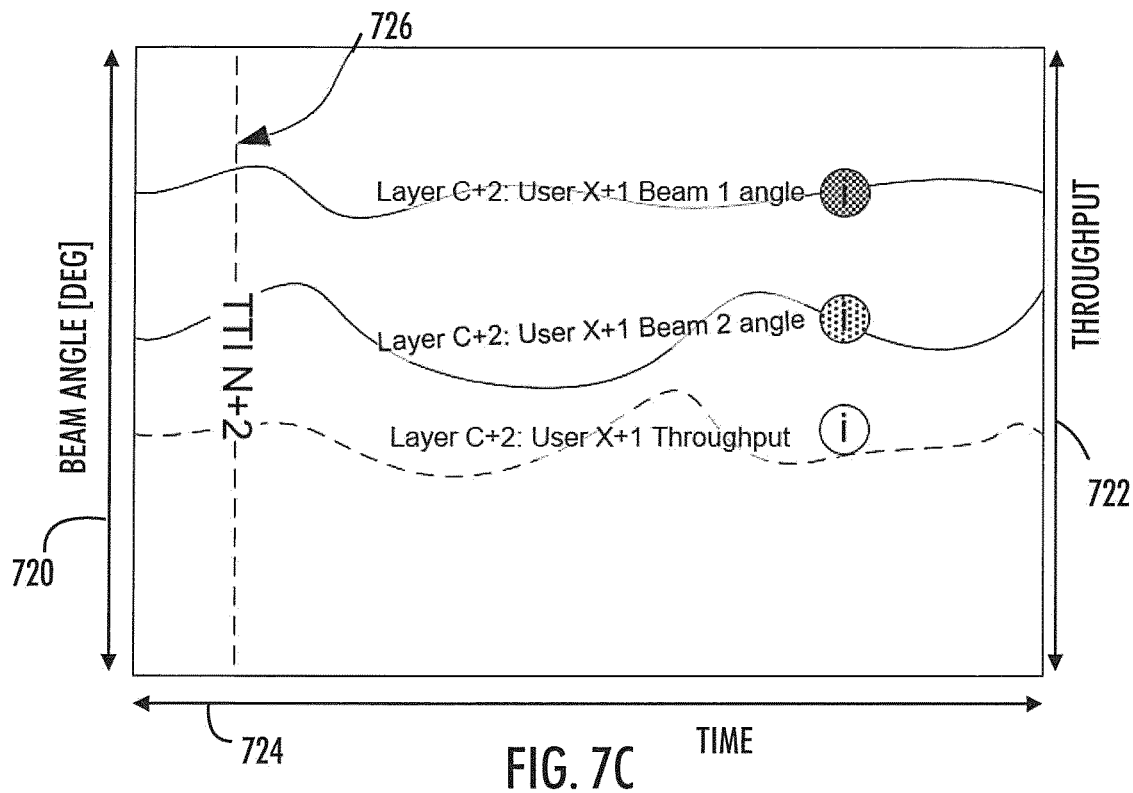

FIG. 7C illustrates an example, where the parameters of the beams are shown inside view. On left y-axis 720 is beam angle in degrees, on right y-axis 722 throughput and on x-axis 724 time. In this view type debugging and relations between different users, parameters and beams may be observed. All views have time dimension which can be used to search through the time utilising a slider control shown in FIG. 7C. It is possible to switch between views. For each view parameter specific info can be shown or viewed. Visible layers can be selected.

To improve readability, different element may be separated by colouring, fill pattern, line types and transparencies, for example, to improve user view. In an embodiment, time window may be moved to any point in time, zoomed and scrolled. Time can play back in slow or high motion to observe changes in visible way.

Without layering and visualization such a complex scenarios including multiple cells, users and beams are impossible to debug with current methods. Layering method can be used for performance monitoring, performance improvements and debugging.

In an embodiment, user specific data from a drive test (such as geographic position, channel estimation indicators) may be compared to beamforming visualization in time wise, for example. This allows debugging/demonstration in different field conditions as now user device data and beamforming data can be visualized at the same time and even play the visualization offline after the tests. Also combined data can be used also afterwards for better analysis rather than repeating the drive test over and over again.

Figure 8:
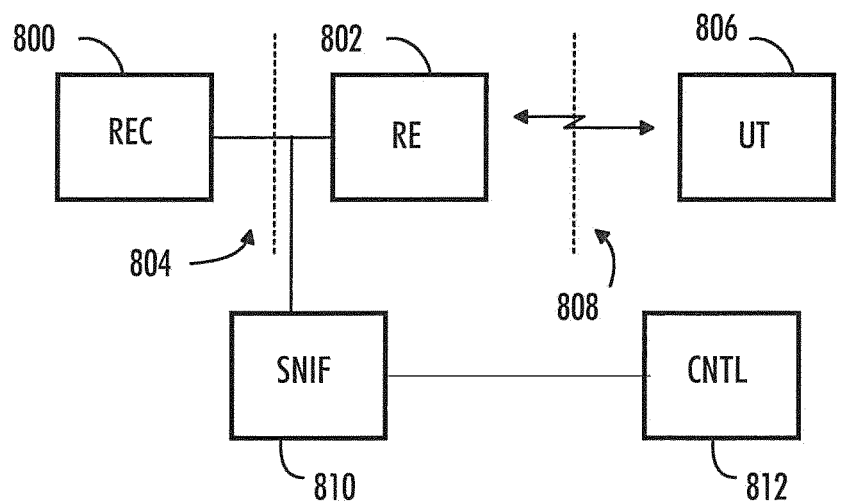
FIG. 8 illustrates an example of obtaining data.

FIG. 8 illustrates an example of receiving parameter data of radio connections. In this example, the base station is divided into a Radio Equipment Controller, REC, or Baseband Unit 800 and a Radio Equipment, RE, or Remote Radio Head 802. The REC 800 and RE 802 communicate with each other utilising a Common Public Radio Interface, CPRI 804. In an embodiment, tThe RE 802 communicates with user terminals 806 over radio interface 808 utilising beams. The data transmitted over the CPRI interface 804 may comprise also information on beam directions used on the radio interface.

A sniffer apparatus 810, known in the art, may monitor data transmitted over the CPRI interface and transmit the data to the apparatus 812 of a radio access network in which embodiments of the invention may be applied which can thus obtain data on beams used in the transmission of TTI streams.

Figure 9A:
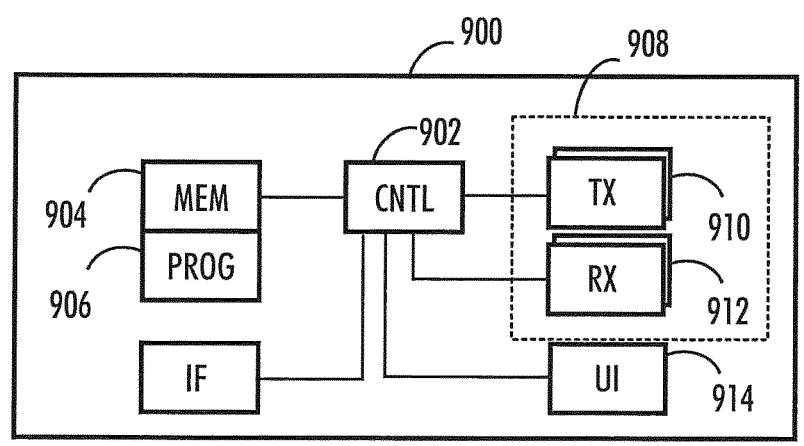
FIGS. 9A and 9B illustrate simplified examples of an apparatus in which some embodiments of the invention may be applied.
Figure 9B:
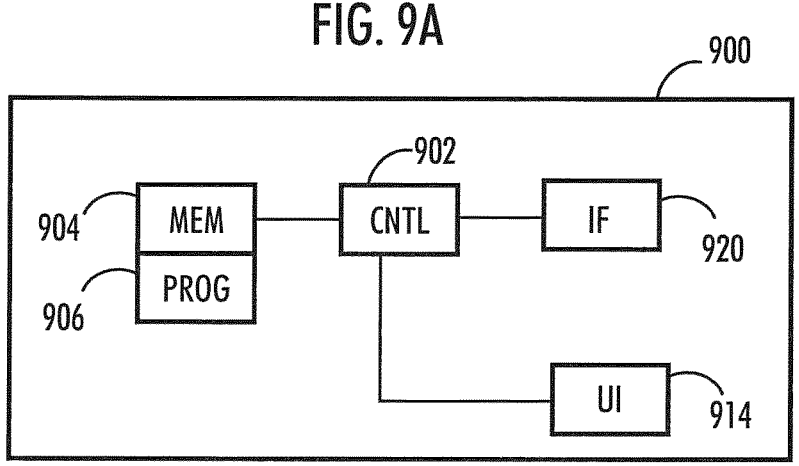

FIGS. 9A and 9B illustrate some embodiments. The figures illustrate simplified examples of an apparatus 900 in which embodiments of the invention may be applied. In some embodiments, as in FIG. 9A, the apparatus may be a base station, an access point, a remote radio head, or end user device, for example. In some embodiments, as in FIG. 9B, the apparatus may be an apparatus operationally connected to a base station, an access point or a remote radio head, or to a user terminal, for example.

It should be understood that the apparatus is depicted herein as an example illustrating some embodiments. It is apparent to a person skilled in the art that the apparatus may also comprise other functions and/or structures and not all described functions and structures are required. Although the apparatus has been depicted as one entity, different modules and memory may be implemented in one or more physical or logical entities. For example, the apparatus may be realized using cloud computing or distributed computing with several physical entities located in different places but connected with each other.

The apparatuses of the examples of FIG. 9A and FIG. 9B include a control circuitry 902 configured to control at least part of the operation of the apparatus.

The apparatuses may comprise a memory 904 for storing data. Furthermore the memory may store software or applications 906 executable by the control circuitry 902. The memory may be integrated in the control circuitry.

The control circuitry 902 is configured to execute one or more applications. The applications may be stored in the memory 904.

In the apparatus of FIG. 9A, the apparatus may further comprise radio interface 908 operationally connected to the control circuitry 902. The radio interface may be connected to a set of phased sub arrays 910.

In the apparatus of FIG. 9A, the apparatus may further comprise one or more interfaces 912 operationally connected to the control circuitry 902. The interface may connect the apparatus to other apparatuses of the radio access system. For example, the interface may be connect the apparatus to core network and to other corresponding apparatuses.

The apparatus of FIG. 9B may further comprise an interface 920 operationally connected to the control circuitry 902. The interface may be connect the apparatus of FIG. 9A to another radio network apparatuses such as to a base station, an access point or a remote radio head, or to a user terminal, for example. The apparatus of FIG. 9B may further comprise a user interface 914, such as a display (which may be touch sensitive), microphone, a speaker, a keyboard, for example.

In an embodiment, the applications 906 stored in the memory 904 executable by the control circuitry 902 may cause the apparatus to perform the steps of receiving parameter data of radio connections between transceivers of the radio access network, the parameter data comprising transmission direction of the beams used in transmission and quality indicators related to transmitted beams, organising data into one or more layers based on parameter data and connections at a given time resolution; receiving a selection of layers at a given time instant; receiving a selection of a view type and displaying of the selected layers of the given time instant using the selected view type.

The steps and related functions described in the above and attached figures are in no absolute chronological order, and some of the steps may be performed simultaneously or in an order differing from the given one. Other functions can also be executed between the steps or within the steps. Some of the steps can also be left out or replaced with a corresponding step.

The apparatuses or controllers able to perform the above-described steps may be implemented as an electronic digital computer, or a circuitry which may comprise a working memory (RAM), a central processing unit (CPU), and a system clock. The CPU may comprise a set of registers, an arithmetic logic unit, and a controller. The controller or the circuitry is controlled by a sequence of program instructions transferred to the CPU from the RAM. The controller may contain a number of microinstructions for basic operations. The implementation of microinstructions may vary depending on the CPU design. The program instructions may be coded by a programming language, which may be a high-level programming language, such as C, Java, etc., or a low-level programming language, such as a machine language, or an assembler. The electronic digital computer may also have an operating system, which may provide system services to a computer program written with the program instructions.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present.

This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

An embodiment provides an apparatus comprising at least one processor; and at least one memory including computer program code, the at least one memory and the computer program code configured to, with the at least one processor, cause the apparatus at least to perform embodiments described above.

An embodiment provides a non-transitory computer program embodied on a distribution medium, comprising program instructions which, when loaded into an electronic apparatus, are configured to control the apparatus to execute the embodiments described above.

The computer program may be in source code form, object code form, or in some intermediate form, and it may be stored in some sort of carrier, which may be any entity or device capable of carrying the program. Such carriers include a record medium, computer memory, read-only memory, and a software distribution package, for example. Depending on the processing power needed, the computer program may be executed in a single electronic digital computer or it may be distributed amongst a number of computers.

The apparatus may also be implemented as one or more integrated circuits, such as application-specific integrated circuits ASIC. Other hardware embodiments are also feasible, such as a circuit built of separate logic components. A hybrid of these different implementations is also feasible. When selecting the method of implementation, a person skilled in the art will consider the requirements set for the size and power consumption of the apparatus, the necessary processing capacity, production costs, and production volumes, for example.

It will be obvious to a person skilled in the art that, as the technology advances, the inventive concept can be implemented in various ways. The invention and its embodiments are not limited to the examples described above but may vary within the scope of the claims.

The invention claimed is:

1. An apparatus, comprising:
at least one processor; and
   at least one non-transitory memory storing instructions, that when executed by the at least one processor, cause the apparatus at least to perform:
   receiving parameter data of radio connections between transceivers of a radio access network, the parameter data comprising transmission direction of the beams used in transmission and quality indicators related to transmitted beams;
   organising data into one or more layers based on parameter data on radio connections at a given time resolution, wherein the one or more layers comprises at least one different time instance of at least one of a $1^{st}$ layer with beams of a given cell, a 2 nd layer with a user of the given cell, or a $3^{rd}$ layer with one or more beams of a given user;

receiving a selection of layers at a given time instant of the different time instances;

receiving a selection of a view type;

controlling displaying of the selected layers of the given time instant using the selected view type.

2. The apparatus of claim 1, wherein the time resolution is transmission time interval of the radio access network.

3. The apparatus of claim 1, the at least one non-transitory memory storing instructions executed by the at least one processor to cause the apparatus to perform: comparing a parameter or quality indicator related to a beam or a layer to a threshold and selecting a beam or a layer for display based on the comparison.

4. The apparatus of claim 1, at least one non-transitory memory storing instructions executed by the at least one processor to cause the apparatus to perform: receiving parameter data related to an ongoing transmission.

5. The apparatus of claim 1, the at least one non-transitory memory storing instructions executed by the at least one processor to cause the apparatus to perform: receiving parameter data from a log file.

6. The apparatus of claim 1, the apparatus further comprising a user interface and the at least one non-transitory memory storing instructions executed by the at least one processor to cause the apparatus to perform: receiving instructions via the user interface for controlling the selection of the layers and displaying the layers.

7. The apparatus of claim 1, the at least one non-transitory memory storing instructions executed by the at least one processor to cause the apparatus to perform: displaying the beams on top of a map.

8. The apparatus of claim 1, the at least one non-transitory memory storing instructions executed by the at least one processor to cause the apparatus to perform: controlling displaying the beams on top of three dimensional view from the transmitter of the beams.

9. The apparatus of claim 1, the at least one non-transitory memory storing instructions is executed by the at least one processor to cause the apparatus to perform: processing received data by adding to the data metadata comprising cell, user and beam related information.

10. The apparatus of claim 1, the at least one non-transitory memory storing instructions executed by the at least one processor to cause the apparatus to perform: receiving parameter data of radio connections between transceivers of the radio access network from Common Public Radio Interface.

11. A method, comprising:

receiving parameter data of radio connections between transceivers of a radio access network, the parameter data comprising transmission direction of the beams used in transmission and quality indicators related to transmitted beams;

organising data into one or more layers based on parameter data and connections at a given time resolution, wherein the one or more layers comprises at least one different time instance of at least one of a $1^{st}$ layer with beams of a given cell, a 2nd layer with a user of the given cell, or a $3^{rd}$ layer with one or more beams of a given user;

receiving a selection of layers at a given time instant;

receiving a selection of a view type;

controlling displaying of the selected layers of the given time instant using the selected view type.

12. The method of claim 11, wherein the time resolution is transmission time interval of the radio access network.

13. The method of claim 11, further comprising comparing a parameter or quality indicator related to a beam or a layer to a threshold and selecting a beam or a layer for display based on the comparison.

14. The method of claim 11, further comprising receiving parameter data related to an ongoing transmission.

15. The method of claim 11, further comprising receiving parameter data from a log file.

16. The method of claim 11, further comprising receiving instructions via a user interface for controlling the selection of the layers and displaying the layers.

17. The method of claim 11, further comprising displaying the beams on top of a map.

18. The method of claim 11, further comprising displaying the beams on top of three dimensional view from the transmitter of the beams.

19. The method of claim 11, further comprising processing received data by adding to the data metadata comprising cell, user and beam related information.

* * * * *